(12) United States Patent
Sato et al.

(10) Patent No.: US 8,049,177 B2
(45) Date of Patent: Nov. 1, 2011

(54) RADIATION IMAGE DETECTION APPARATUS AND MANUFACTURING METHOD OF THE SAME

(75) Inventors: Keiichiro Sato, Ashigarakami-gun (JP); Makoto Kitada, Ashigarakami-gun (JP); Kei Miura, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/829,763

(22) Filed: Jul. 2, 2010

(65) Prior Publication Data

US 2011/0006213 A1    Jan. 13, 2011

(30) Foreign Application Priority Data

Jul. 10, 2009   (JP) ................................. 2009-164205

(51) Int. Cl.
*G01T 1/20* (2006.01)
(52) U.S. Cl. ...................................................... 250/367
(58) Field of Classification Search .................... 250/367
See application file for complete search history.

(56) References Cited

U.S. PATENT DOCUMENTS

| | | | | |
|---|---|---|---|---|
| 5,149,971 | A * | 9/1992 | McElhaney et al. | 250/361 R |
| 5,179,284 | A * | 1/1993 | Kingsley et al. | 250/370.11 |
| 7,521,685 | B2 * | 4/2009 | Hennessy et al. | 250/370.11 |
| 7,893,405 | B2 * | 2/2011 | Nagano et al. | 250/370.11 |
| 2001/0054694 | A1 * | 12/2001 | Kusuyama et al. | 250/367 |
| 2005/0051736 | A1 | 3/2005 | Isoda et al. | |

FOREIGN PATENT DOCUMENTS

| | | |
|---|---|---|
| EP | 1 115 011 A1 | 7/2001 |
| JP | 10-221456 A | 8/1998 |
| JP | 2001-330677 A | 11/2001 |
| JP | 3333278 B2 | 10/2002 |
| JP | 2003-060181 A | 2/2003 |
| JP | 2005-114731 A | 4/2005 |
| JP | 2007170908 A * | 7/2007 |
| JP | 2007-315866 A | 12/2007 |
| JP | 2008-51793 A | 3/2008 |

OTHER PUBLICATIONS

EP Communication, dated Mar. 23, 2011, issued in corresponding EP Application No. 10168292.0, 10 pages.
Notice of Reasons for Rejection, dated May 31, 2011, issued in corresponding JP Application No. 2009-164205, 5 pages in English and Japanese.

\* cited by examiner

*Primary Examiner* — Kiho Kim
(74) *Attorney, Agent, or Firm* — Sughrue Mion, PLLC

(57) ABSTRACT

A radiation image detection apparatus comprising a scintillator, which is configured to include columnar crystals and converts radiation into light when the radiation is irradiated thereon, and an optical detector, which converts the light, emitted from the scintillator into an electrical signal, the scintillator and the optical detector being arranged on a support such that the radiation is incident on the optical detector and the scintillator in this order, wherein a columnar crystal area is present at a radiation-incident side of the scintillator, and a non-columnar crystal area is present at a side of the scintillator opposite to the radiation-incident side; and a method for manufacturing the radiation image detection apparatus are provided.

20 Claims, 5 Drawing Sheets

RADIATION IMAGE DETECTION APPARATUS AND MANUFACTURING METHOD OF THE SAME

CROSS-REFERENCE TO RELATED APPLICATION

This application is based on and claims priority under 35 USC 119 from Japanese Patent Application No. 2009-164205, filed on Jul. 10, 2009, the disclosure of which is incorporated by reference herein.

BACKGROUND OF THE INVENTION

1. Field of the Invention

The present invention relates to a radiation image detection apparatus, which is used in an X-ray imaging apparatus for medical use or the like, and a manufacturing method of the same.

2. Description of the Related Art

In recent years, a radiation image detection apparatus, such as a Flat Panel Detector (FPD), capable of directly converting radiation into digital data, has been put to practical use. The radiation image detection apparatus is being rapidly distributed since it has an advantage of being able to immediately verify an image compared to conventional image plates.

Various types of such radiation image detection apparatuses were proposed. For example, an indirect type converts radiation into light in a single operation using a scintillator of, for example, CsI:Tl, GOS ($Gd_2O_2S$:Tb), or the like, converts the converted light into electric charges through a semiconductor layer, and then stores the electric charges.

It is preferred to decrease the amount of radiation emitted when the radiation image detection apparatus is used, for example, in living bodies. In the field of optical detectors, the scintillator, which emits a great amount of light and has high sensitivity, is preferable. From that point of view, several radiation image detection apparatuses were proposed (e.g., Japanese Patent No. 3333278 and Japanese Patent Application Laid-Open (JP-A) No. 2001-330677). Such a radiation image detection apparatus is constructed by attaching a scintillator, made of crystals of CsI or the like, to an insulating substrate, and emits radiation from an optical detector side.

In the scintillator, which is configured to include such crystals, it is known in theory that sensitivity rises as according to the thickness of the crystals. In practice, however, if the thickness of the crystals is increased up to a certain value, light is attenuated or scattered while it is passing through the scintillator. This causes problems such as being unable to obtain sufficient sensitivity or blurring of an image. Therefore, additional improvement in sensitivity is required.

For the purpose of improving sensitivity, a radiation image detection apparatus was proposed, in which a scintillator layer is constructed with an assembly of columnar crystals, and which ensures that the density of an activator has a slope (e.g., JP-A No. 2008-51793). However, there is possibility that the scintillator may decrease the yield of an article due to the need for precision in process control during the manufacturing. In addition, neither sensitivity nor the resolution of a produced image is satisfactory, and improvement is still demanded.

SUMMARY OF THE INVENTION

The present invention has been made in view of the above circumstances and provides radiation image detection apparatus and a manufacturing method of the same.

A first aspect of the present invention provides a radiation image detection apparatus comprising a scintillator, which is configured to include columnar crystals and converts radiation into light when the radiation is irradiated thereon, and an optical detector, which converts the light emitted from the scintillator into an electrical signal, the scintillator and the optical detector being arranged on a support such that the radiation is incident on the optical detector and the scintillator in this order, wherein a columnar crystal area is present at a radiation-incident side of the scintillator, and a non-columnar crystal area is present at a side of the scintillator opposite to the radiation-incident side.

A second aspect of the present invention provides a method of manufacturing a radiation image detection apparatus according to the first aspect of the present invention, comprising forming a scintillator on a support by a vapor deposition method, so as to form a non-columnar crystal area and a columnar crystal area in this order on the support by changing one or both conditions of a degree of vacuum and a temperature of the support.

DETAILED DESCRIPTION OF THE INVENTION

Hereinafter, radiation image detection apparatuses according to exemplary embodiments of the invention will now be described with reference to the accompanying drawings.

A radiation image detection apparatus according to an exemplary embodiment of the invention is used in an X-ray imaging apparatus or the like. The radiation image detection apparatus includes a light-emitting layer, which emits light when radiation is irradiated thereon, and a conductive layer, which converts the light of the light-emitting layer. When the radiation, which contains image information, is irradiated on the radiation image detection apparatus, it records the image information and outputs an image signal, which represents the recorded image information.

Below, a description will be given of an exemplary embodiment of the invention with reference to the drawings.

Figure 1:
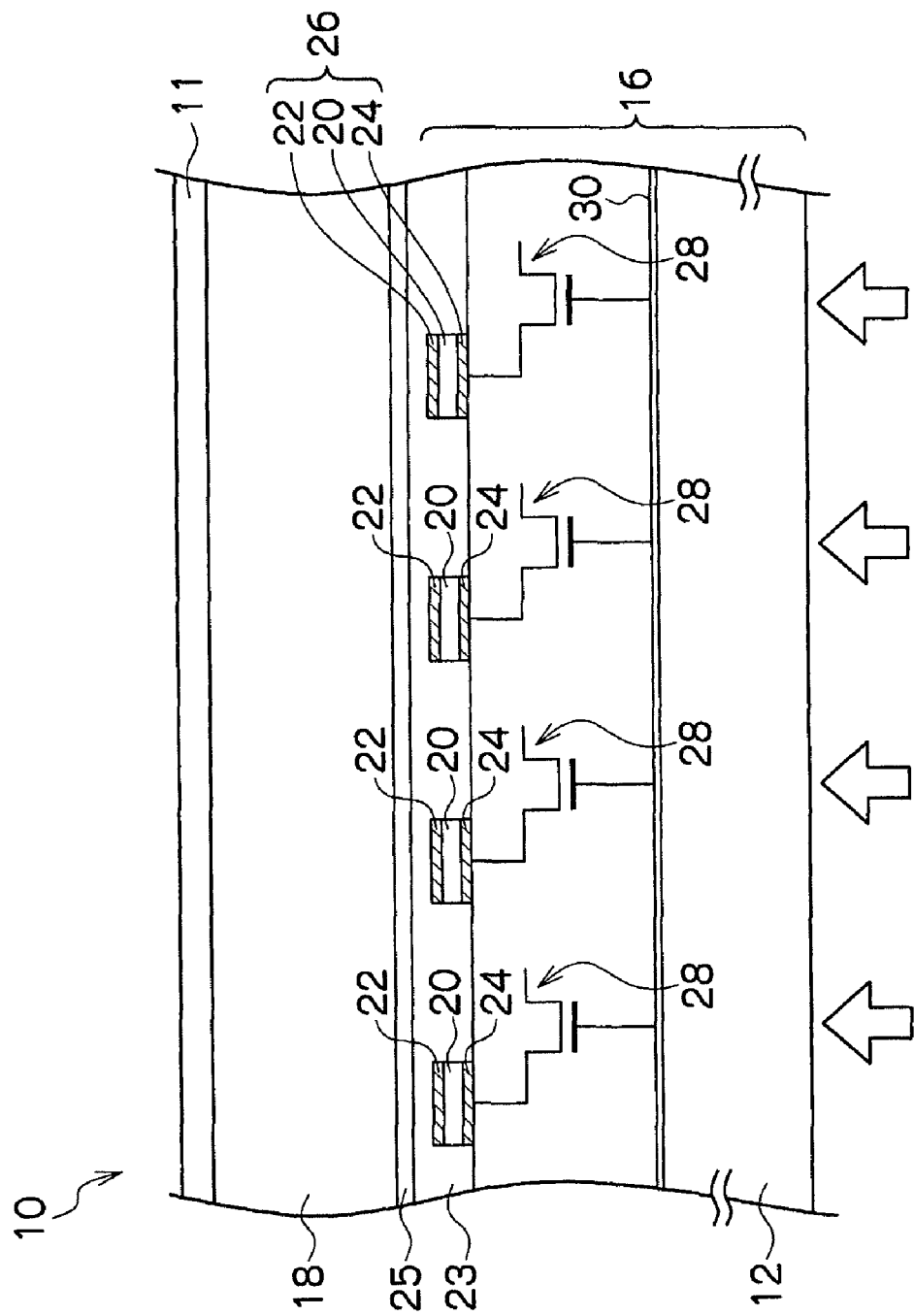
FIG. 1 is a schematic side view schematically showing the construction of a radiation image detection apparatus related to indirect conversion mode.
Figure 2:
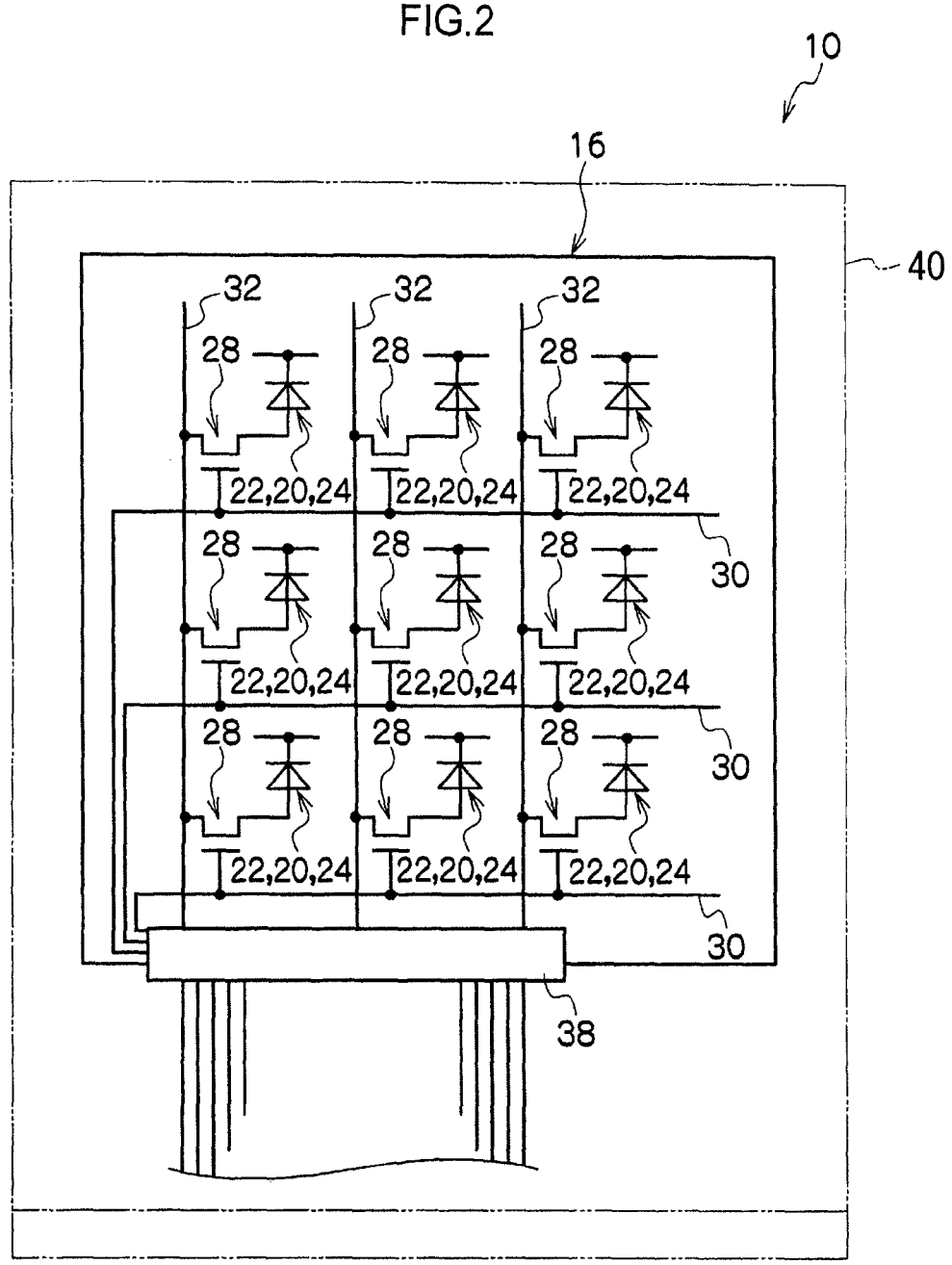
FIG. 2 is a schematic view schematically showing the construction of a radiation detection apparatus according to an exemplary embodiment of the invention.
Figure 3:
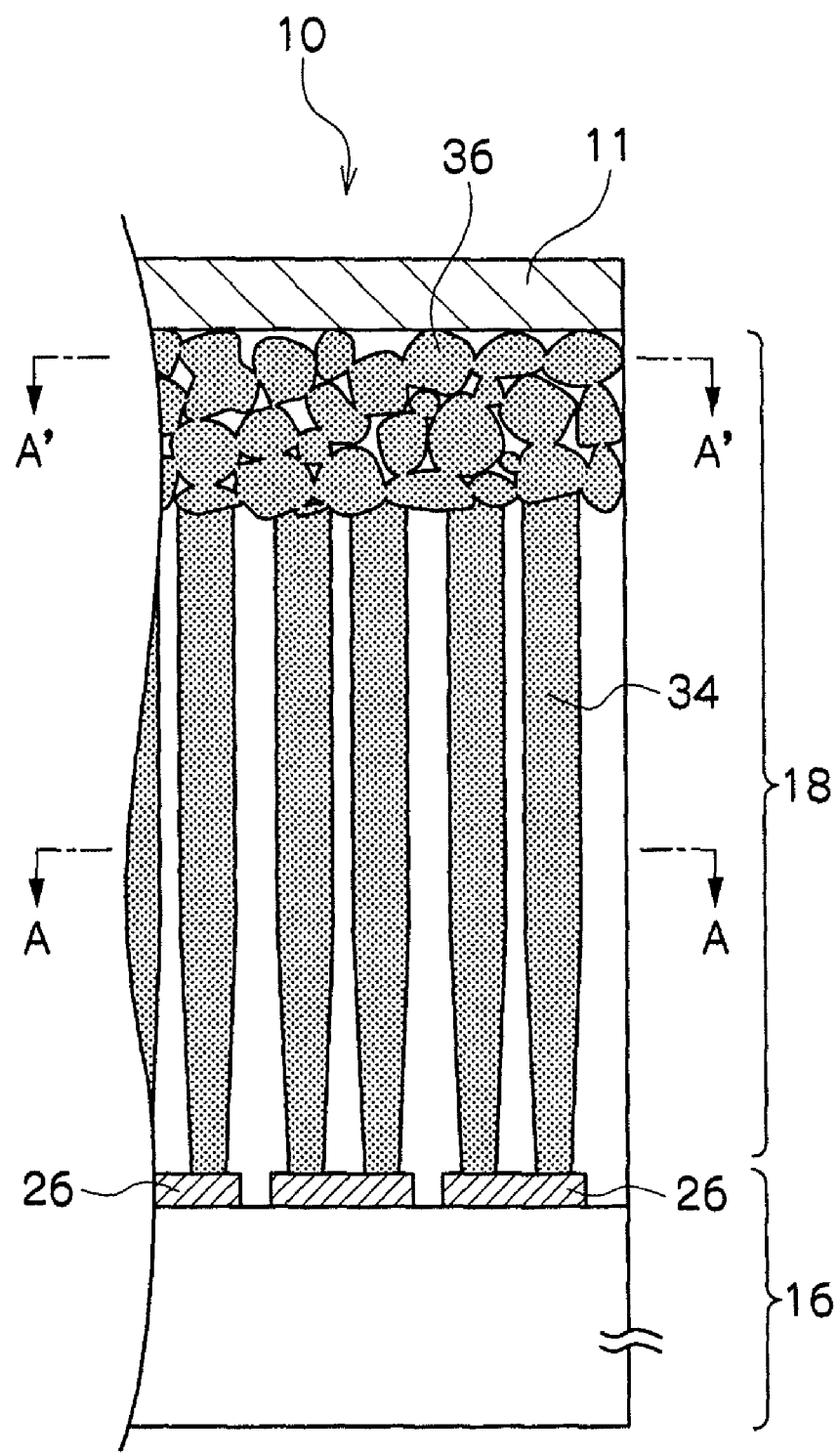
FIG. 3 is a schematic view schematically showing the crystal construction of a scintillator section of the radiation image detection apparatus according to an exemplary embodiment of the invention.
Figure 6:
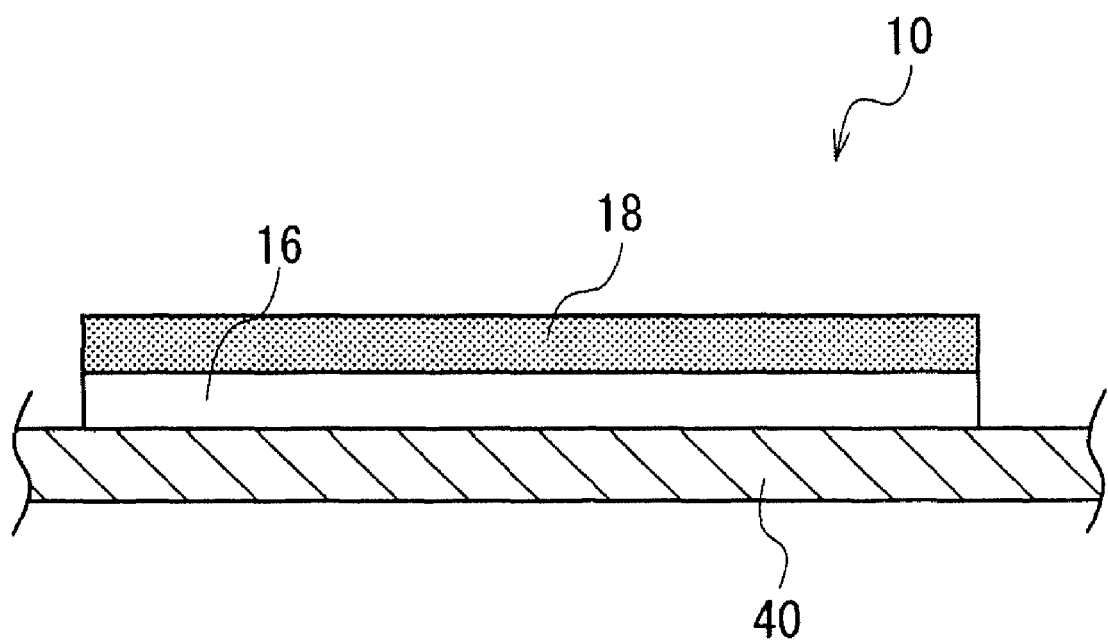
FIG. 6 is a schematic view schematically showing the overall construction of the radiation image detection apparatus according to an exemplary embodiment of the invention.

Construction of Radiation Image Detection Apparatus According to Exemplary Embodiment of the Invention First, the construction of a radiation image detection apparatus according to an exemplary embodiment of the invention will be described. FIG. 1 is a schematic side view schematically showing the construction of a radiation image detection apparatus related to indirect conversion mode. FIG. 2 is a schematic view schematically showing the construction of a radiation image detection apparatus according to an exemplary embodiment of the invention, viewed from the support side. FIG. 3 is a schematic view schematically showing the construction of a scintillator layer of the radiation image detection apparatus according to an exemplary embodiment of the invention. FIG. 6 is a schematic view schematically showing the overall construction of the radiation image detection apparatus.

As shown in FIG. 1, the radiation image detection apparatus 10 includes a TFT substrate 16 with switch elements 28 formed on an insulating substrate 12. Each of the switch elements 28 is constructed with a Thin-Film Transistor (TFT). In this embodiment, the TFT substrate 16 having a photoelectric transformation layer 26, which will be described later, serves as an optical detector 16.

The TFT substrate 16 is adhered to a scintillator layer 18, which converts incident radioactive rays into light, via a planarizing layer 23 and an adhesive layer 25 interposed therebetween. The scintillator layer 18 is formed on a support 11 as a radiation-converting layer that converts incident radioactive rays (arrows indicate the direction of incidence) into light.

The scintillator layer 18 can be made of a crystal, for example, of CsI:Tl, $Gd_2O_2S$:Tb (GOS), Thallium-activated Sodium Iodide (NaI:Tl, or Sodium-activated Cesium Iodide (CsI:Na). However, the scintillator layer 18 is not limited to these materials. It is also preferred that the scintillator layer be constructed with CsI:Tl in consideration that emission spectrum matches the maximum value (in the vicinity of 550 nm) of the spectral sensitivity of an a-Si photodiode and that aging deterioration due to humidity rarely occurs.

Below, a detailed description will be given of the scintillator layer 18 of this exemplary embodiment.

In this exemplary embodiment, a columnar crystal area, which includes columnar crystals 34, is present in the radiation incidence side of the scintillator layer 18, and a non-columnar crystals area, which includes non-columnar crystals 36, is present opposite to the radiation incidence side of the scintillator layer.

The area including the columnar crystals 34 serves to prevent an image from being blurred since the columnar crystals 34, capable of realizing efficient light emission, is present adjacent to the optical detector 16 and the intervals between the columnar crystals 34 function as a guide to reduce light dispersion, thereby preventing the image from being blurred. Furthermore, light, which has reached a deep portion, is reflected from the area constructed with the non-columnar crystals 36, thereby improving the detection efficiency of light emission.

FIG. 3 is a schematic view showing the crystal area in the scintillator layer 18. Unlike the radiation image detection apparatus shown in FIG. 1, FIG. 3 shows the state where the optical detector 16 and the scintillator layer 18 are in direct contact with each other without a resin layer, such as the adhesive layer 25, interposed between them. As shown in FIG. 3, when the thickness of the area of the columnar crystals 34 present in the radiation incidence side of the scintillator layer 18 is set to be $t_1$, and the thickness of the area of the non-columnar crystals 36 present opposite to the radiation incidence side of the scintillator layer 18 is set to be $t_2$, it is preferred that the relationship between $t_1$ and $t_2$ satisfy the following Formula 1.

$$0.01 \leq (t_2/t_1) \leq 0.25$$

Since the thickness $t_1$ of the area of the columnar crystals 34 and the thickness $t_2$ of the area of the non-columnar crystals 36 satisfy the above Formula 1, light emission efficiency, the prevention of light dispersion, and the area, from which light is reflected, in the thickness direction of the scintillator fall within very suitable ranges, thereby further improving light emission efficiency, light detection efficiency, and image resolution. If the thickness $t_2$ of the non-columnar crystal area is too large, the area with low light emission efficiency increases, thereby leading to a danger of decreased sensitivity. From that point of view, the range of $t_2/t_1$ is more preferably from 0.02 to 0.10.

Figure 4:
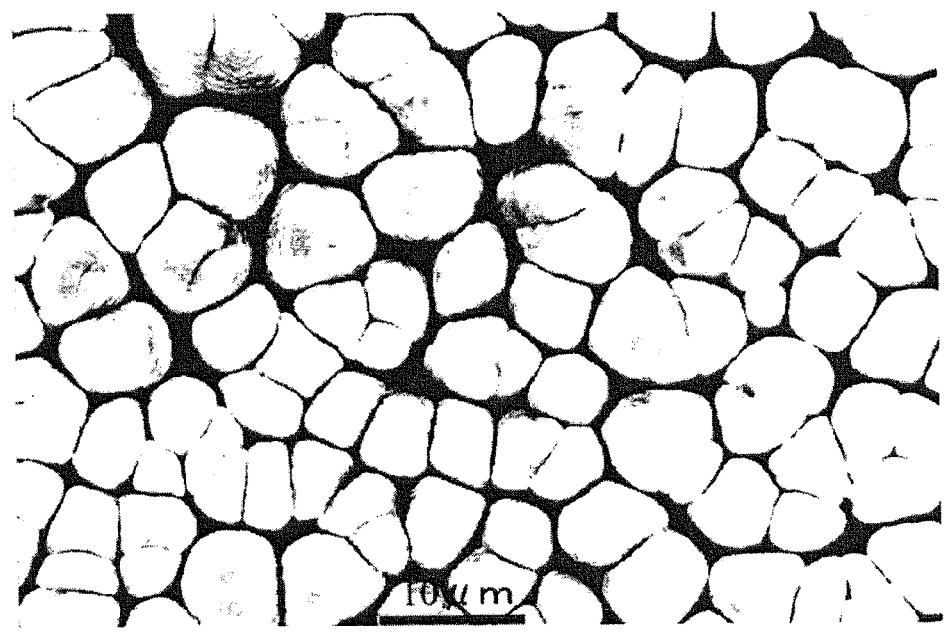
FIG. 4 is an electron micrograph showing a columnar crystal area that forms a scintillator.

FIG. 4 is an electron micrograph showing the A-A cross section of the columnar crystals 34 forming the scintillator layer shown in FIG. 3. As clearly shown in FIG. 4, it can be appreciated that, in the area including the columnar crystals 34, the columnar crystals 34 have a cross-sectional diameter that is substantially regular with respect to the growth direction of the crystals, and are present independently from each other due to the intervals defined along the circumference of the column portions. It is thought that this area has high light emission efficiency and the intervals between the columnar crystals serve as a light guide that suppresses the spread of light.

Here, the crystal cross-sectional diameters of the column portions of the columnar crystals are preferably from 2.0 μm to 15.0 μm from the viewpoint of efficient light introduction and, more preferably, from 4.0 μm to 10.0 μm.

In addition, according to an aspect of the invention, the crystal cross-sectional diameters indicate the maximum diameters of the crystals observed on the surface in the growth direction of the columnar crystals. In a detailed measuring method, the column diameter (crystal cross-sectional diameter) is measured by observing the columnar crystals on a surface perpendicular to the film thickness direction of the columnar crystals using a Scanning Electron Microscope (SEM). Observation is performed at a magnification (about 2000 times) that allows 100 to 200 columnar crystals to be observed in one imaging when the scintillator is viewed from the surface, and a value is used that is produced by averaging the maximum column diameters of the columnar crystals for all of the crystals included in one imaging. The column diameters (μm) are read down to two decimal places, and the average is obtained by rounding off the numbers to one decimal place according to JIS Z 8401.

Figure 5:
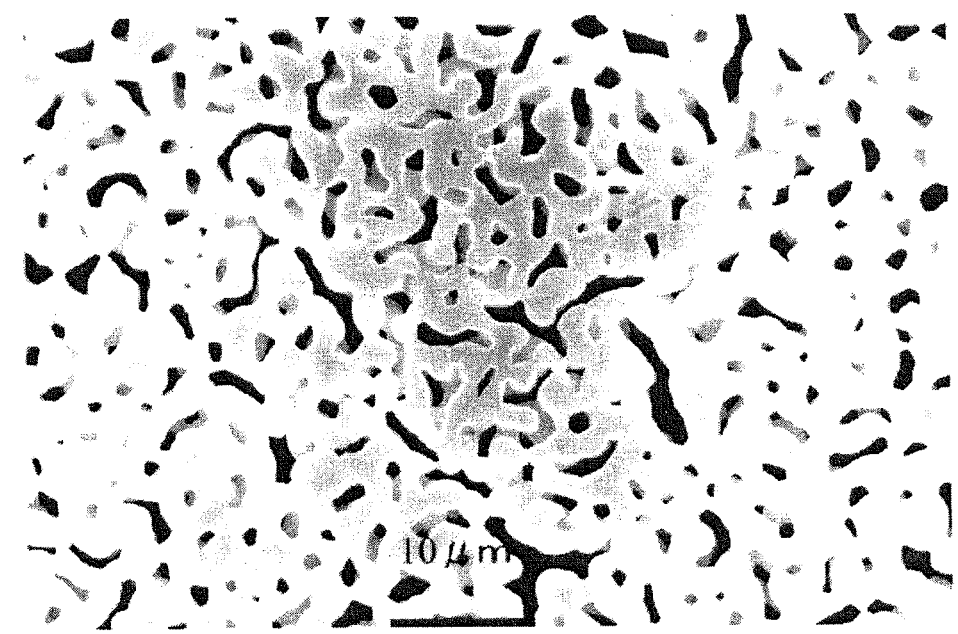
FIG. 5 is an electron micrograph showing a non-columnar crystal cross section of a non-columnar crystal area that forms a scintillator.

FIG. 5 is an electron micrograph showing the cross section of the non-columnar crystals 36 of the scintillator layer 18, taken along line A'-A' in FIG. 3. As clearly shown in FIG. 5, in the non-columnar crystal area, clear intervals between the crystals are rarely observed since the crystals irregularly combine with or overlap each other.

If crystals are adhered to each other as in the non-columnar crystal area, it is thought that a line that binds vacancies (depressions) between adjacent crystals is a grain boundary, and column diameters and crystal cross-sectional diameters corresponding to the column diameters are measured by dividing the adhered crystals from each other so that they become minimum polygons. The crystal diameters are averaged in the same fashion as in the columnar crystal area, and the average is used.

The crystal cross-sectional diameters of the non-columnar crystals is preferably from 0.5 μm to 7.0 μm in the viewpoint of effective reflection, more preferably, from 0.5 μm to 7.0 μm, and further more preferably, from 1.0 μm to 6.0 μm.

In addition, it is preferred that the crystal shape of the non-columnar crystals be substantially spherical and that the non-columnar crystal area be configured as a combination of crystals, which have a shape similar to a spherical shape (i.e., substantially spherical crystals) from the viewpoint of reflection efficiency.

The scintillator layer 18, in which the area of the columnar crystals 34 and the area of the non-columnar crystals 36 are formed continuously, can be formed simply over the appropriate support 11 by a vapor deposition method, which will be described below.

The support 11 can be selected appropriately from the group consisting of a carbon plate, a Carbon Fiber Reinforced Plastic (CFRP), a glass plate, a quartz plate, a sapphire plate, a metal sheet, and the like. The metal sheet is made of one selected from the group consisting of iron, tin, chromium, aluminum, and the like. However, the support 11 is not limited particularly to these examples as long as it can form the crystal areas, which form the scintillator layer 18, over the surfaces thereof.

The insulating substrate 12 can be selected from among, for example, a glass substrate, a variety of ceramic substrates, and a resin substrate. In addition, the insulating substrate 12 is not limited to these materials.

Light transmission layers 20, which generate electric charges when light converted by the scintillator layer 18 is incident, are arranged between the scintillator layer 18 and the TFT substrate 16. A bias electrode 22 for applying a bias voltage to the light transmission layer 20 is formed over the surface of each light transmission layer 20, which faces the scintillator layer 18.

Charge-collecting electrodes 24, which collect electric charges generated by the light transmission layer 20, are formed over the TFT substrate 16. In the TFT substrate 16, the switch elements 28 read the electric charges collected by the individual electric charge-collecting electrodes 24. A laminated structure, which includes the respective bias electrode 22, the light transmission layer 20, and the electric charge-collecting electrode 24, is referred to as the photoelectric transformation layer 26.

The charge-collecting electrodes 24 are arranged in a two-dimensional configuration in the TFT substrate 16 and, as shown in FIG. 2, the switch elements 28 are arranged on an insulating substrate 12, in a two dimensional configuration corresponding to the charge-collecting electrodes 24.

In addition, plural gate lines 30 and plural signal lines (data lines) 32 are provided in the TFT substrate 16. The gate lines 30 serve to turn on/off the individual switch elements 28 connected in a certain direction (row direction), and the signal lines (data lines) 32 are connected in a certain direction (column direction) perpendicular to the gate lines 30 and serve to read electric charges via the switch elements 28, which are turned on.

In addition, the planarizing layer 23 for planarizing the TFT substrate 16 is formed over the TFT substrate 16. In addition, the adhesive layer 25, which bonds the scintillator layer 18 to the TFT substrate 16, is formed between the TFT substrate 16 and the scintillator layer 18 over the planarizing layer 23.

In addition, as described below, the adhesive layer 25 and the planarizing layer 23 made of resin are not necessarily required between the TFT substrate 16 and the scintillator layer 18. The surface of the TFT substrate 16 can be set to be opposite to and in direct contact with the area of the columnar crystals 34, which forms the scintillator layer 18.

The TFT substrate 16 has a quadrilateral shape having four sides on the outer circumference when seen in a plan view. Specifically, the TFT substrate 16 is rectangular shaped.

A connector terminal 38 is arranged on one side of the edges of the TFT substrate 16 when seen in a plan view, and the individual gate lines 30 and the individual signal lines 32 are connected thereto. The connector terminal 38, as shown in FIG. 2, is connected to a circuit substrate via a connecting circuit. The circuit substrate includes a gate line driver (not shown) as an outer circuit and a signal processing section (not shown) as an outer circuit.

The respective switch elements 28 are turned on, sequentially line by line, by signals supplied via the gate lines 30 from the gate line driver. Electric charges read by the turned-on switch elements 28 are transmitted as charge signals via the signal lines 32 and input into the signal processing section. Thereby, the electric charges are read sequentially line by line, so that a two-dimensional radiation image can be acquired.

In addition, while the signal lines 32 and the gate lines 30 are provided so as to bisect each other at right angles in the configuration described above, the gate lines 30 and the signal lines 32 can be provided in parallel such that the gate lines 30 and the signal lines 32 are connected to the connector terminal arranged on one side of the edges of the TFT substrate 16.

The radiation image detection apparatus 10 as described above employs indirect conversion mode, which detects radiation by first converting the radiation into light and then converting the light into electric charges.

In this exemplary embodiment, as shown in FIG. 6, the TFT substrate 16 and the scintillator layer 18 are arranged on the surface of the substrate 40 as the optical detector, which was described above. Radiation is allowed to be incident first on the side of the support 40 and then on the scintillator layer 18 through the TFT substrate 16.

Such a radiation image detection apparatus can be used as being assembled to a variety of apparatuses including an X-ray imaging apparatus for medical use, such as a mammography, which needs a fine image using a small amount of radiation emission capable of detecting a high-sensitivity and high-precision radiation image. The range of application of the radiation image detection apparatus is wide since, for example, it can be used as an industrial X-ray imaging apparatus in nondestructive tests or as a detection apparatus that uses particle beams ($\alpha$ rays, $\beta$ rays, and $\gamma$ rays) rather than electromagnetic waves.

Next, a description will be given of a method of manufacturing a radiation image detection apparatus, the method capable of efficiently manufacturing the radiation image detection apparatus of the invention as described above.

It is preferred that the scintillator layer 18 be formed directly over the surface of the support 11 by a vapor deposition method. Due to the vapor deposition method, it is possible to continuously form the non-columnar crystal area and the columnar crystal area in sequence. Here, by way of example, a configuration made of CsI:Tl will be described.

The vapor deposition method can be performed using a known method. That is, it is preferred that CsI:Tl be evaporated by heating using a means for flowing current through a resistive heating furnace or the like in the atmosphere at a degree of vacuum from 0.01 to 10 Pa, so that CsI:Tl is deposited over the support 11 that has a temperature from room temperature (20° C.) to 300° C.

When forming a crystal phase of CsI:Tl over the support 11 by the vapor deposition method, it is usual that a cluster of relatively small crystals, which has a diameter corresponding to that of an indeterminate or substantially spherical crystal, is formed. When the vapor deposition method is carried out, it is possible to grow the columnar crystals by the vapor deposition method, continuously after the non-columnar crystal area is formed, by changing the condition of the degree of vacuum and/or the temperature of the support.

That is, after the non-columnar crystal area is formed up to a certain thickness $t_2$, it is possible to efficiently and uniformly grow columnar crystals using at least one of a means for raising the degree of vacuum and a means for raising the temperature of the support.

After the scintillator layer 18 is formed over the support 11 as above, it is possible to produce the radiation image detection apparatus 10 according to an aspect of the invention by arranging the scintillator layer 18 to overlap an optical detector. The method of overlapping the scintillator layer 18 over the optical detector 16 is not specifically limited. Any method can be used as long as both are optically combined. As the method of arranging both to overlap, a method, which brings both into direct contact by arranging them opposite to each other, or a method, which brings both into contact via any of an adhesive layer or a planarizing layer, can be employed.

The method, which brings both elements into direct contact, includes a method of bringing the surface on the side of the scintillator layer 18 at which the columnar crystal area is present and the TFT substrate 16, which serves as the optical detector, into contact with each other by arranging them in opposition to each other after the scintillator layer 18 is formed over the support 11. In this fashion, the radiation image detection apparatus 10 is manufactured by stacking and aligning both the scintillator layer 18 and the TFT substrate 16. In the process of bringing the respective elements into contact with each other, it is not required to bring the surfaces of both elements into complete contact with each other. Even if depressions and protrusions formed by the crystals are present on the surface of the scintillator layer 18, both can be optically combined with each other by being arranged one over the other. When light converted from radiation by the scintillator layer 18 is incident on the TFT substrate 16, the effects of the invention can be obtained.

In addition, it is preferred to optically combine both by bringing the surface of the side of the formed scintillator layer 18, in which the area of columnar crystals 34 is present, and the optical detector 16 to be opposite to each other via a resin layer. Available examples of the resin layer may include a planarizing layer, which is for planarizing the surface of the scintillator layer 18, an adhesive layer, which fixedly brings both into contact, a matching oil layer, which is made of transparent liquid or gel, and the like. The resin, which forms the resin layer, is not specifically limited as long as it allows scintillation light, which is generated from the scintillator layer 18, to pass through to the optical detector 16 without reducing the light.

Available examples of the resin, which forms the planarizing layer, may include polyimide, parylene, and the like. Polyimide, which has good film-forming property, is preferable.

The adhesive agent, which forms the adhesive layer, is not limited to those that are optically transparent to the scintillation light, which is generated from the scintillator layer 18. Available examples of the adhesive agent may include a thermoplastic resin, an Ultraviolet (UV) curing adhesive agent, a thermosetting adhesive agent, a room-temperature curing adhesive agent, a double-sided adhesive sheet, and the like. From the viewpoint of not decreasing the sharpness of the image, it is preferred to use an adhesive agent made of a low-viscosity epoxy resin since it can form an adhesive layer that is sufficiently thin in relation to the pixel size of the optical detector 16.

In addition, as described above, the thickness of the resin layer is preferably 50 μm or less from the viewpoints of the sensitivity and image and more preferably in the range from 5 μm to 30 μm.

According to the method as described above, it is possible to efficiently and easily manufacture the radiation image detection apparatus according to an aspect of the invention. In addition, the manufacturing method according to an aspect of the invention also has an advantage capable of simply and easily manufacturing various specifications of scintillator layers according to designs by controlling the degree of vacuum and the temperature of the support in the forming of the film of the scintillator layer.

EXAMPLES

Below, the present invention will be described in detail with respect to Examples. However, the present invention is not limited to the detailed Examples.

Example 1

1. Forming of Scintillator Layer

A non-alkali glass substrate (0.7 mm thick) was prepared as a support.

First, a support was surface-treated using Ar plasma for the purpose of improving adhesiveness with a CsI crystal layer. Afterwards, the surface-treated support was set in a vacuum chamber, which serves to form a scintillator film. The vacuum chamber included plural furnaces, which serve to heat raw materials, that is, CsI and TlI independently. After air was exhausted from the chamber, the degree of vacuum was set to be 0.75 Pa by introducing a certain amount of Ar. At a time point when the melting conditions of the raw materials were stabilized due to heating of the raw material furnaces, the support was rotated on a concentric circle by an apparatus tool of the vacuum apparatus, a shutter was opened, and deposition of an area of non-columnar crystals 36 was started.

Film-forming was carried out under these conditions, and at a time point when the thickness $t_2$ of the non-columnar crystals 36 became 5 μm, deposition of columnar crystals 34 was started by raising the degree of vacuum to 1 Pa. In addition, in the case of changing the degree of vacuum, in order to change the melting conditions of the raw materials, it was confirmed whether or not the melting conditions were stabilized by closing the shutter in one operation and the deposition was then started again by opening the shutter in the next operation. At a time point when the thickness $t_1$ of the columnar crystals 34 became 500 μm, heating of the raw material furnaces was stopped and suction using was performed a vacuum apparatus so that a scintillator (hereinafter, referred to as scintillator layer) 18, which had the non-columnar crystals 36 and the columnar crystals 34, was formed due to deposition on the support.

2. Evaluation of Physical Properties of Scintillator Layer 2-1. Measurement of Thickness $t_2$ of Non-Columnar Crystal Area and Thickness $t_1$ of Columnar Crystal Area A film thickness was measured by cutting a portion of the scintillator layer and observing the cut portion from the side in the direction of the columnar crystals using a Scanning Electron Microscope (SEM). The value of the film thickness was an average of values measured at 10 random portions, which were selected from the cut portion. In addition, since CsI is nonconductive, SEM observation was performed after Au was sputtered at about 200 Å.

2-2. Measurement of Crystal Diameter of Non-Columnar Crystal and Columnar Crystal A portion of the scintillator layer was peeled off from the support or a light-detecting substrate of Comparative Example 1, which will be described later, and a column diameter (i.e., a cross-sectional diameter of a columnar crystal) was measured by observing the peeled portion in the direction of the film thickness of the columnar crystal using the Scanning Electron Microscope (SEM). Observation was performed at a magnification (about 2000 times) that allows 100 to 200 columnar crystals to be observed by one imaging when the scintillator was viewed from the surface, and the maximum column diameters of the columnar crystals for all of the crystals included in one imaging were measured and averaged.

In addition, if crystals are adhered to each other as in the non-columnar crystal area, it was regarded that a line, which binds depressions (recesses) between adjacent crystals, was a grain boundary, and column diameters and crystal diameters corresponding to the column diameters were measured by dividing the adhered crystals from each other so that they became minimum polygons. The column diameters ($\mu$m) were read down to two decimal places, and an average was obtained by rounding off the numbers to one decimal place according to JIS Z 8401.

If it was difficult to peel the scintillator layer from the support, the scintillator layer was sliced in the growth direction of the crystals at a position 100 $\mu$m from the support, was etched using Ar ion up to the distance where phenomena in the surroundings of the grain boundary of the CsI crystals attached to the support could be observed, and was then observed from the etched surface. Since CsI is nonconductive, SEM observation was performed after Au of was sputtered at about 200 Å.

3. Manufacturing of Radiation Image Detection Apparatus

An optical detector 16 was prepared, and an adhesive layer 25 was formed by applying a low-viscosity epoxy resin adhesive agent (Araldite 2020, trade name, available from Hantman Inc.), diluted with a solvent, on the surface using a spin coater so that the thickness became 15 $\mu$m after the solvent was evaporated. The adhesive layer 25 formed over the optical detector 16 and the columnar crystal area of the produced scintillator layer 18 were placed opposite to each other and heated so that the optical detector 16 and the scintillator layer 18 were attached to each other via the adhesive layer 25.

Afterwards, a TFT-driving circuit substrate and a charge-reading Integrated Circuit (IC) were attached to a terminal of the optical detector 16 via an anisotropic conductive film so as to be connected to a circuit substrate, which serves to perform drive control and Analog-Digital (AD) conversion. Thereby, a radiation image detection apparatus 10 of Example 1 was manufactured.

It was arranged so that radiation is incident from the optical detector 16 side, and reading of a radiation image was performed by controlling a scanning Personal Computer (PC), which was connected to the radiation image detection apparatus 10 via a cable.

4. Evaluation of Radiation Image Detection Apparatus 4-1. Sensitivity

X-rays were used for radiation. The optical detector 16 was driven using an electrical circuit when emitting the X-rays, and the amount of electric charges, generated from scintillated light through photoelectric transformation by a photodiode, were calculated by reading the electric charges, amplifying the electric charges using a charge amplifier, and then performing the AD conversion on the electric charges.

An amount of electric charges (noises of the detection apparatus), which was read when X-rays were not being emitted, was measured in advance and was subtracted from an amount of electric charges, which was read when X-rays were being emitted, and the subtracted value was set as the sensitivity. In addition, the result is presented as a relative value when sensitivity in Comparative Example 1 was set as 100, which will be described later. The sensitivity in Example 1 was 120.

4-2. Modulation Transfer Function (MTF)

An MTF curve was produced by calculating an edge shape, which was possible to obtain by imaging the MTF edge made of tungsten (W), based on the IEC standard. The result was compared with the value 2 cycle/mm, and was presented as a relative value when the value of Comparative Example 1 was set as 100. The MTF of Example 1 was 100.

4-3. Comprehensive Evaluation

The performance of the radiation image detection apparatus was judged using a product of the evaluation results of the sensitivity and the MTF as an index. It is preferred that the difference in the performance be clearly recognized when the image is subjectively evaluated as the product of the sensitivity and the MTF be 120 or more. The comprehensive evaluation of Example 1 was 120, and it can be understood that the sensitivity and the sharpness of the image were better than those of Comparative Example 1, which will be described below.

Comparative Example 1

A support was changed using the glass substrate used in Example 1, and a glass substrate, on the surface of which recesses and protrusions with pitches of 5 $\mu$m and heights of 5 $\mu$m were formed by wet etching, was used.

A radiation image detection apparatus of Comparative Example 1 was manufactured in the same fashion as in Example 1, except that deposition on a non-columnar crystal area was not performed in the forming of the scintillator layer but columnar crystals were directly deposited on a support. Evaluation was performed in the same fashion as in Example 1, and relative effects were produced by setting the result of Comparative Example 1 to be 100.

Example 2 to Example 6

Radiation image detection apparatuses of Examples 2 to 6 were manufactured in the same fashion as in Example 1, except for setting the thickness of the non-columnar crystal area in Example 1 according to the description in Table 1 by changing the deposition time when the degree of vacuum was 0.75 Pa, and were evaluated in the same fashion. The results are presented in Table 1 below.

Example 7 to Example 11

Radiation image detection apparatuses of Examples 7 to 11 were manufactured in the same fashion as in Example 1, except for forming the film of the non-columnar crystal area in Example 1 by changing the degree of vacuum according to the description in Table 1 so that the crystal diameters in the non-columnar crystal area were the same as the description in Table 1, and were evaluated in the same fashion. The results are reported in Table 1 below.

Comparative Example 2

A support was changed using the glass substrate used in Example 3, and a scintillator layer 18 was formed directly over the surface of the optical detector 16 in the same conditions as in Example 3. In this state, a non-columnar crystal area was first formed around an optical detector 16, and then a columnar crystal area was formed. Thus, attachment using a thermoplastic adhesive agent was not performed. Except for this treatment, the process was performed the same as in Example 3.

TABLE 1

| | | Morphology of scintillator | | | | | | | | |
|---|---|---|---|---|---|---|---|---|---|---|
| | Method of forming scintillator film | | | Non-columnar crystal area | | Columnar crystal area | | | Evaluation result | | |
| | | Degree of vacuum | | | Average | | Average | | | | |
| | Support | Non-columnar crystal area | Columnar crystal area | Film thickness $t_2$ (μm) | crystal diameter (μm) | Film thickness $t_1$ (μm) | column diameter (μm) | Film thickness ratio $t_2/t_1$ | Sensitivity | MTF | Comprehensive evaluation |
| Ex.1 | Non-alkali glass | 0.75 Pa | 1 Pa | 5 | 3.3 | 500 | 7.6 | 0.01 | 120 | 100 | 120 |
| Ex.2 | Non-alkali glass | 0.75 Pa | 1 Pa | 10 | 3.0 | 500 | 7.2 | 0.02 | 121 | 100 | 121 |
| Ex.3 | Non-alkali glass | 0.75 Pa | 1 Pa | 25 | 3.0 | 500 | 6.8 | 0.05 | 123 | 101 | 124 |
| Ex.4 | Non-alkali glass | 0.75 Pa | 1 Pa | 50 | 3.1 | 500 | 7.2 | 0.10 | 122 | 100 | 122 |
| Ex.5 | Non-alkali glass | 0.75 Pa | 1 Pa | 125 | 3.4 | 500 | 7.1 | 0.25 | 120 | 100 | 120 |
| Ex.6 | Non-alkali glass | 0.75 Pa | 1 Pa | 170 | 3.2 | 500 | 7.0 | 0.34 | 121 | 94 | 114 |
| Ex.7 | Non-alkali glass | 0.1 Pa | 1 Pa | 25 | 11.2 | 500 | 6.8 | 0.05 | 111 | 91 | 101 |
| Ex.8 | Non-alkali glass | 0.3 Pa | 1 Pa | 25 | 8.0 | 500 | 7.0 | 0.05 | 117 | 99 | 116 |
| Ex.9 | Non-alkali glass | 0.5 Pa | 1 Pa | 25 | 6.2 | 500 | 7.0 | 0.05 | 123 | 100 | 123 |
| Ex.10 | Non-alkali glass | 1.5 Pa | 1 Pa | 25 | 1.5 | 500 | 7.2 | 0.05 | 122 | 100 | 122 |
| Ex.11 | Non-alkali glass | 3 Pa | 1 Pa | 25 | 0.5 | 500 | 7.0 | 0.05 | 122 | 100 | 122 |
| Comp. Ex. 1 | Patterning substrate | — | 1 Pa | — | — | 530 | 6.8 | — | 100 | 100 | 100 |
| Comp. Ex. 2 | Optical detector (TFT) substrate | 0.75 Pa | 1 Pa | 25 | 3.1 | 500 | 6.9 | 0.05 | 98 | 96 | 94 |

As apparent from Table 1, it can be understood that images produced from the radiation image detection apparatuses of Examples 1 to 11 of the invention have high sensitivity and higher sharpness than those produced from Comparative Example 1, in which the scintillator layer was made entirely of the columnar crystals, since degradation in image quality, such as image blurring, was prevented.

Meanwhile, it can be understood that Comparative Example 2 having the non-columnar crystal area around the optical detector 16 cannot realize sufficient sensitivity because of scattering and degradation in light emission efficiency in the non-columnar crystal area.

In addition, it can be understood from Examples 1 to 11, in particular, that sensitivity is good and image blurring is prevented if the ratio $t_2/t_1$ between the thickness $t_1$ of the columnar crystal area and the thickness $t_2$ of the non-columnar crystal area is in a preferred range and the crystal diameter of the non-columnar crystals is in a preferred range.

The invention includes the following exemplary embodiments:
(1) A radiation image detection apparatus comprising a scintillator, which is configured to include columnar crystals and converts radiation into light when the radiation is irradiated thereon, and an optical detector, which converts the light emitted from the scintillator into an electrical signal, the scintillator and the optical detector being arranged on a support such that the radiation is incident on the optical detector and the scintillator in this order,
wherein a columnar crystal area is present at a radiation-incident side of the scintillator, and a non-columnar crystal area is present at a side of the scintillator opposite to the radiation-incident side.

(2) The radiation image detection apparatus according to (1), wherein a thickness $t_1$ of the columnar crystal area at the radiation-incident side of the scintillator and a thickness $t_2$ of the non-columnar crystal area at the side opposite to the radiation-incident side of the scintillator have a relationship that satisfies the following Formula 1:

$$0.01 \leq (t_2/t_1) \leq 0.25.$$

(3) The radiation image detection apparatus according to (2), wherein the thickness $t_1$ of the columnar crystal area and the thickness $t_2$ of the non-columnar crystal area have a relationship that satisfies the following Formula 2:

$$0.02 \leq (t_2/t_1) \leq 0.10.$$

(4) The radiation image detection apparatus according to (1), wherein non-columnar crystals in the non-columnar crystal area have a cross-sectional diameter from 0.5 μm to 7.0 μm.
(5) The radiation image detection apparatus according to (1), wherein the columnar crystals in the columnar crystal area have a cross-sectional diameter from 2.0 μm to 15.0 μm.
(6) The radiation image detection apparatus according to (1), wherein the scintillator is configured to include crystals that contain CsI and Tl.
(7) The radiation image detection apparatus according to (1), wherein the scintillator is formed on the support by a vapor deposition method.
(8) The radiation image detection apparatus according to (1), wherein a surface of the side of the scintillator at which the columnar crystal area is present and the optical detector are arranged so as to oppose each other and are optically combined via a resin layer.
(9) The radiation image detection apparatus according to (8), wherein the resin layer comprises at least one selected from the group consisting of a planarizing layer, an adhesive layer, and a matching oil layer.
(10) The radiation image detection apparatus according to (9), wherein the planarizing layer comprises polyimide or parylene.
(11) The radiation image detection apparatus according to (9), wherein the adhesive layer comprises an adhesive agent comprising a low-viscosity epoxy resin.

(12) A method of manufacturing a radiation image detection apparatus according to any one of (1) to (11), comprising forming a scintillator on a support by a vapor deposition method, so as to form a non-columnar crystal area and a columnar crystal area in this order on the support by changing one or both conditions of a degree of vacuum and a temperature of the support.

(13) The method according to (12), further comprising, after forming the scintillator, bringing a surface of a side of the scintillator at which the columnar crystal area is present into opposition to and close contact with the optical detector.

(14) The method according to (12), further comprising, after forming the scintillator, optically combining a surface of a side of the scintillator at which the columnar crystal area is present with the optical detector by arranging the surface of the side of the scintillator and the optical detector in opposition to each other via a resin layer.

All publications, patent applications, and technical standards mentioned in this specification are herein incorporated by reference to the same extent as if each individual publication, patent application, or technical standard was specifically and individually indicated to be incorporated by reference.

What is claimed is:

1. A radiation image detection apparatus comprising a scintillator, which is configured to include columnar crystals and converts radiation into light when the radiation is irradiated thereon, and an optical detector, which converts the light emitted from the scintillator into an electrical signal, the scintillator and the optical detector being arranged on a support such that the radiation is incident on the optical detector and the scintillator in this order, wherein a columnar crystal area is present at a radiation-incident side of the scintillator, and a non-columnar crystal area is present at a side of the scintillator opposite to the radiation-incident side.

2. The radiation image detection apparatus according to claim 1, wherein a thickness $t_1$ of the columnar crystal area at the radiation-incident side of the scintillator and a thickness $t_2$ of the non-columnar crystal area at the side opposite to the radiation-incident side of the scintillator have a relationship that satisfies the following Formula 1:

$$0.01 \leq (t_2/t_1) \leq 0.25.$$

3. The radiation image detection apparatus according to claim 2, wherein the thickness $t_1$ of the columnar crystal area and the thickness $t_2$ of the non-columnar crystal area have a relationship that satisfies the following Formula 2:

$$0.02 \leq t2/t1 \leq 0.10.$$

4. The radiation image detection apparatus according to claim 1, wherein non-columnar crystals in the non-columnar crystal area have a cross-sectional diameter from 0.5 μm to 7.0 μm.

5. The radiation image detection apparatus according to claim 1, wherein the columnar crystals in the columnar crystal area have a cross-sectional diameter from 2.0 μm to 15.0 μm.

6. The radiation image detection apparatus according to claim 1, wherein the scintillator is configured to include crystals that contain CsI and Tl.

7. The radiation image detection apparatus according to claim 1, wherein the scintillator is formed on the support by a vapor deposition method.

8. The radiation image detection apparatus according to claim 1, wherein a surface of the side of the scintillator at which the columnar crystal area is present and the optical detector are arranged so as to oppose each other and are optically combined via a resin layer.

9. The radiation image detection apparatus according to claim 8, wherein the resin layer comprises at least one selected from the group consisting of a planarizing layer, an adhesive layer, and a matching oil layer.

10. The radiation image detection apparatus according to claim 9, wherein the planarizing layer comprises polyimide or parylene.

11. The radiation image detection apparatus according to claim 9, wherein the adhesive layer comprises an adhesive agent comprising a low-viscosity epoxy resin.

12. The radiation image detection apparatus according to claim 8, wherein the resin layer has a thickness in the range of from 5 μm to 30 μm.

13. A method of manufacturing a radiation image detection apparatus according to claim 1, comprising forming a scintillator on a support by a vapor deposition method, so as to form a non-columnar crystal area and a columnar crystal area in this order on the support by changing one or both conditions of a degree of vacuum and a temperature of the support.

14. The method according to claim 13, further comprising, after forming the scintillator, bringing a surface of a side of the scintillator at which the columnar crystal area is present into opposition to and close contact with the optical detector.

15. The method according to claim 13, further comprising, after forming the scintillator, optically combining a surface of a side of the scintillator at which the columnar crystal area is present with the optical detector by arranging the surface of the side of the scintillator and the optical detector in opposition to each other via a resin layer.

16. The radiation image detection apparatus according to claim 1, wherein non-columnar crystals of the non-columnar crystal area are adhered to each other at least in a vertical direction to a film thickness direction of the non-columnar crystals.

17. The radiation image detection apparatus according to claim 1, wherein non-columnar crystals of the non-columnar crystal area are adhered to each other in a vertical direction to a film thickness direction of the non-columnar crystals in a part which the non-columnar crystals contact with the support.

18. The radiation image detection apparatus according to claim 1, wherein non-columnar crystals of the non-columnar crystal area have a substantially spherical crystal shape.

19. The radiation image detection apparatus according to claim 1, wherein the support is a metal sheet.

20. The radiation image detection apparatus according to claim 1, wherein the optical detector comprises a glass substrate.

* * * * *